June 17, 1930.  H. W. BUNDY  1,763,755
TUBING
Filed Nov. 4, 1927  2 Sheets-Sheet 1
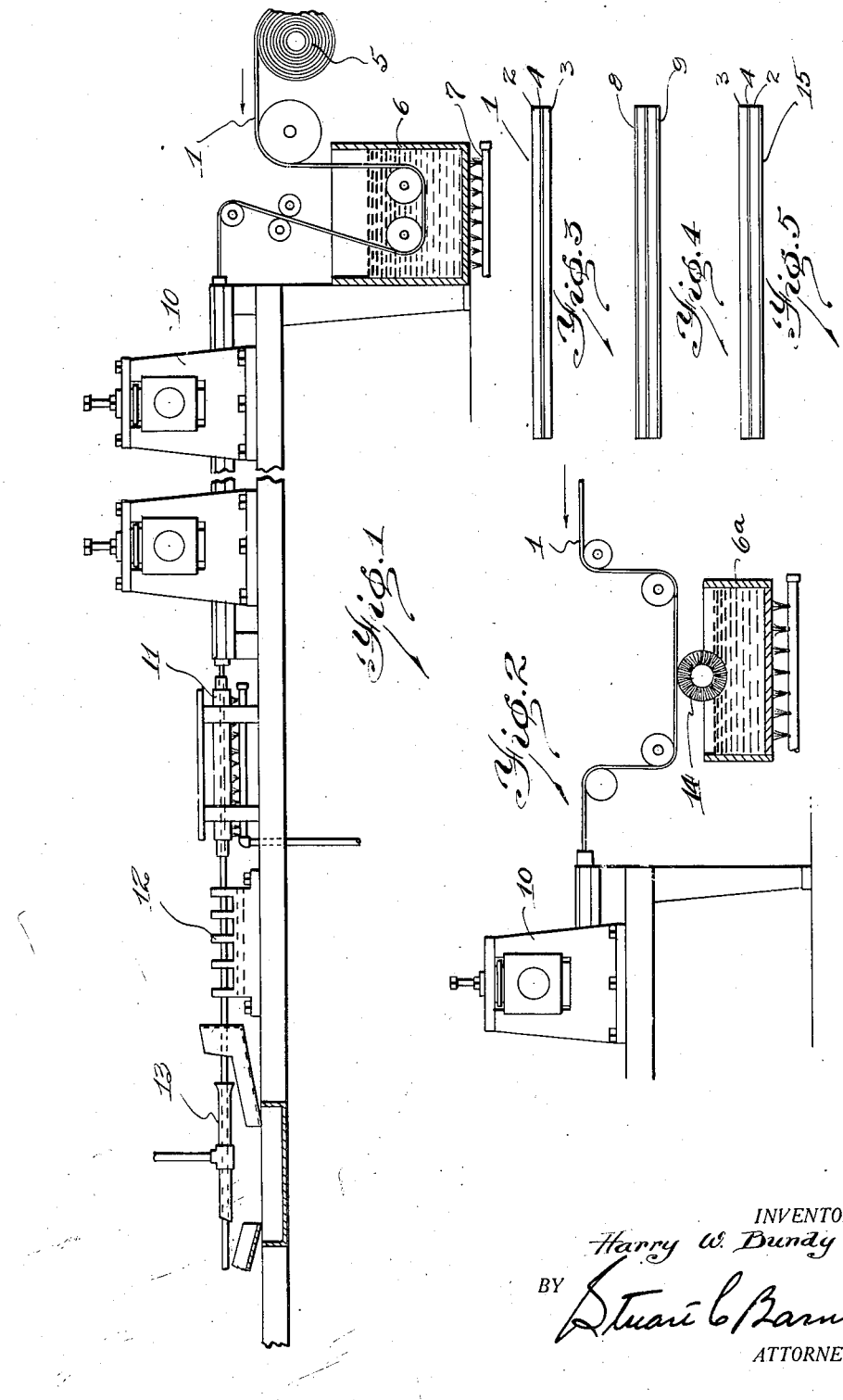
INVENTOR.
Harry W. Bundy
BY Stuart C. Barnes
ATTORNEY.

June 17, 1930.   H. W. BUNDY   1,763,755
TUBING
Filed Nov. 4, 1927   2 Sheets-Sheet 2
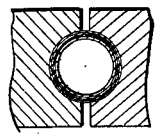
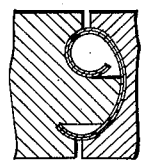
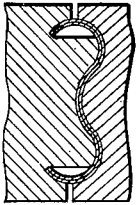
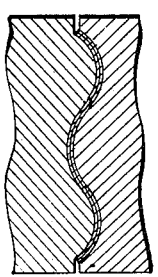
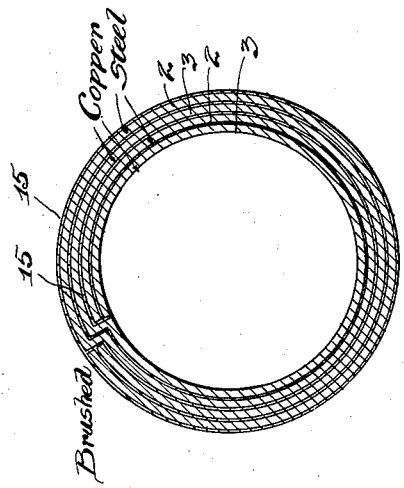
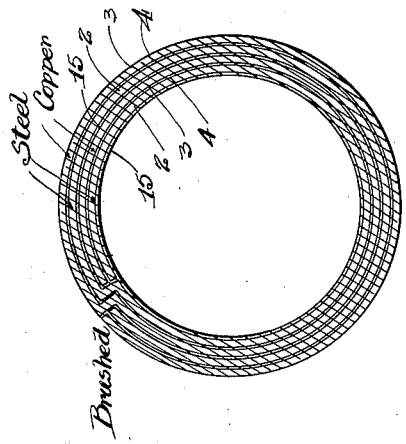
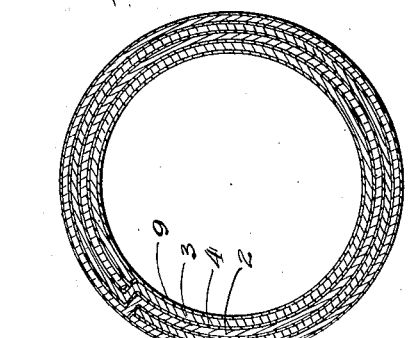
INVENTOR.
*Harry W. Bundy*
BY
ATTORNEY.

Patented June 17, 1930

1,763,755

UNITED STATES PATENT OFFICE

HARRY W. BUNDY, OF DETROIT, MICHIGAN, ASSIGNOR, BY MESNE ASSIGNMENTS, TO BUNDY TUBING COMPANY, OF DETROIT, MICHIGAN, A CORPORATION OF MICHIGAN

TUBING

Application filed November 4, 1927. Serial No. 231,093.

This invention relates to a tubing composed of plies of different kinds of metal, at least one of which is of a non-corrodible nature.

It is an object of the invention to provide a tube of exceptional strength and durability, the walls of which are made up of a plurality of metal plies. The tube can be constructed so that the non-corrodible metal may be the exposed outer ply, or the inner ply of the tube. A tube constructed in accordance with the invention, which is to be used as a gasoline feed line, a radiator tube or the like, will preferably have the non-corrodible metal on the inside. A tube which is to be used where the outside is subjected to undesirable corrosion will preferably be formed with the non-corrodible metal on the outside. Examples of such use are where a tube is to be immersed in a substance which tends to corrode metal, or where tubes of a large size are used as railings, or tubular supporting members such as towel racks or other tubular fitments, in which a more or less ornamental appearance is desired.

In the accompanying drawings:

Fig. 1 is a diagrammatic side view, with a portion shown in section, of a machine for making the tube.

Fig. 2 is a view illustrating a machine for making a tube of a slightly varied nature.

Fig. 3 depicts a section of strip stock from which the tube is made.

Fig. 4 depicts this strip stock after a coating of solder or other sealing metal has been applied to each side of the stock.

Fig. 5 depicts a section of the stock with sealing metal applied to but one side.

Figs. 6 to 10 are diagrammatic sectional views illustrating how flat strip stock is formed into a tube by a succession of forming rolls.

Fig. 11 is a sectional view taken through a tube constructed in accordance with the invention.

Fig. 12 is a sectional view taken through a tube formed of plural ply stock with the sealing metal applied to but one side of the stock.

Fig. 13 is a view showing a tube similar to that of Fig. 12, but with the plies of stock reversed.

The tube is made from muti-ply stock 1 (Fig. 3). Preferably the stock consists of two plies of metal 2 and 3 secured together as by means of a layer of solder 4. It is within the invention, however, of utilizing stock of more than two plies, and any suitable fusing metal can be used for securing the plies together, of which solder is perhaps the most common.

In the making of the tube, the stock is drawn from a suitable supply 5, and over suitable guide rollers through a solder bath 6, the solder being kept molten by a burner 7. Thus, solder is applied to both sides of the stock, as shown at 8 and 9 in Fig. 4. The stock thus tinned, or provided with a coating of solder, is next moved through a battery of forming rolls which roll the stock transversely into tube form. The apparatus for forming the stock into tubes may be of the type shown in my Patent #1,476,796, granted December 11, 1923. The machine may include forming rolls arranged in sequence, as shown in Figs. 6 to 10, inclusive, with the forming rollers of Fig. 10 completing the formation of the tube.

The strip stock of the tube is moved through the machine with continuous movement, and after being formed by the rollers, is passed through a sweating die 11 where the heat is sufficient to melt the solder and cause the several layers to adhere together. The tube may then be passed through sizing dies 12 for finishing the tube and for removing excess solder; and finally through a bath 13 of cooling water.

It will be noted that the stock is rolled in such a manner that the stock forms an inner tube wall which is covered by an outer wall of the stock. This forms a tube, as shown in Figs. 11, 12 and 13, with a double wall construction with the stock rolled once around itself to provide the double walls. Each wall is made up of a number of plies, in the present case two plies, of different metals.

The ply 3 of the stock may be copper or brass, and the outer ply 2 may be steel. A tube formed from this stock may have the copper ply on the inside and the steel ply on the outside. Such a tube is useful as a radiator tube or gasoline line. The interior of the tube is of non-corrodible material, whereas the outer ply is of steel which makes a tube of exceptional strength. Also the outer ply is covered with a coating of tin which renders the outside of the tube substantially non-corrodible and prevents rusting of the steel. The stock can be rolled so that the inner ply of the tube is of steel and the outer ply of copper where it is desirable to have the outside of the tube of copper.

It may be desirable to make a tube with the non-corrodible metal on the outside and not covered with a coating of solder or tin. In this case, the solder may be applied to only one side of the stock in the manner shown in Fig. 2 wherein a rotating brush 14 dips into a solder bath 6ª and applies a film of solder 15 to one side of the stock, as shown in Fig. 5. When the tube is rolled up the exterior ply will be exposed, as shown in Fig. 12. Such a tube is useful where it is to be immersed in liquid or other substance which would corrode steel. Also it is useful for various fitments such as towel racks and the like, and the brass or copper exterior ply can be finished off, if desired, by a plating of nickel or chromium.

The tube shown in Fig. 13 has the non-corrodible ply on the interior and corrodible ply on the exterior. However, the stock for the making of this tube was not given a solder bath, as shown in Fig. 1, but the solder was applied to one side of the stock only, after the manner shown in Fig. 2. Thus the interior of the tube is of exposed brass or copper and the exterior of steel, having a coating of tin or solder. The plies of metal are arranged the same as they are in the tube shown in Fig. 11, but the non-corrodible metal is exposed on the inside of the tube and not covered with a layer of the solder.

A tube constructed in accordance with this invention is one which provides a desirable feature of a non-corrodible metal. Such metal is relatively expensive, but by making the tube of a multiply stock the ply on the non-corrodible metal may be relatively thin thus to reduce the cost of the tube, at the same time the tube is given strength by reason of the ply of steel, which strength is further increased by forming the walls of a double thickness of the multiply stock.

Claims:

1. A tube comprising a length of stock which is made up of a ply of non-corrodible metal and a ply of corrodible metal, and which has a layer of solder on the ply of corrodible metal, said length of stock having a hollow cross-sectional shape to provide a double-thickness tube wall with the coating of solder serving to fix the double walls together, and serving to provide a substantially non-corrodible covering for the tube.

2. A tube comprising a length of stock, which is made up of a ply of copper and a ply of steel permanently fixed together by solder and having a coating of solder over the steel ply, said length of stock being fashioned to provide a tube with walls of double thickness of the stock with the coating of solder serving to secure the two thicknesses of the wall together and serving as a substantially non-corrodible covering for the steel ply.

3. A tube comprising a length of stock which is made up of a ply of copper and a ply of steel permanently fixed together, a coating of solder on the stock, said length of stock being fashioned to provide a tube with walls of a double thickness of the stock with the coating of solder serving to seal the thicknesses together and forming a substantially non-corrodible covering for the inside and outside of the tube.

4. A tube comprising a length of stock, which is made up of two plies of metal one of which is of steel, and which are permanently fixed together, a coating of solder on the stock, the said length of stock being fashioned to provide a tube with walls of double thickness of the stock with inner and exterior plies, with the coating of solder serving to fix the thicknesses together, and forming a substantially non-corrodible covering for the inner and exterior plies of tube.

5. A tube comprising, a length of multiply stock having a hollow cross sectional shape, said stock having been rolled transversely through substantially 720° to provide a tube wall of two layers of multiply stock, said layers being in contact with each other and secured together by sealing metal.

6. A tube comprising, a length of double ply stock having a hollow cross sectional shape, said stock having been rolled transversely through substantially 720° to provide a tube wall four plies thick, all of said plies being in substantial contact with each other and secured together by sealing metal.

In testimony whereof I affix my signature.

HARRY W. BUNDY.